UNITED STATES PATENT OFFICE.

HENRY A. GARDNER, OF WASHINGTON, DISTRICT OF COLUMBIA.

PIGMENT AND METHOD OF PREPARING THE SAME.

1,216,980.

Specification of Letters Patent.  Patented Feb. 20, 1917.

No Drawing.  Application filed July 14, 1916.  Serial No. 109,312.

*To all whom it may concern:*

Be it known that I, HENRY A. GARDNER, a citizen of the United States, residing at Washington, in the District of Columbia, have invented certain new and useful Improvements in Pigments and Methods of Preparing the Same, of which the following is a specification.

This invention relates to a novel composition of matter comprising an organic vehicle, such as linseed oil, oxidized oils, rubber or the like, in association with a pigment-material consisting of or containing substantial proportions of an insoluble compound of zirconium. The invention relates also to a paint pigment containing a compound of zirconium, and to methods whereby the said pigment may be prepared in a form possessing particular advantages for use in conjunction with organic vehicles of the type above mentioned.

I have found that paints possessing great hiding power may be produced by grinding in linseed oil or other suitable vehicle, pigments which contain a substantial proportion of a suitable zirconium compound, preferably zirconium oxid. Although I find that zirconium oxid alone constitutes an excellent pigment in conjunction with such vehicles, exposure tests have shown that even better results are obtained when other pigments, such as zinc oxid, silica, barium or calcium sulfate, etc., are used in conjunction or admixture therewith. When a crystalline pigment such as barium sulfate is used in conjunction with the zirconium pigment, the hiding power of the latter is extended through its strongly marked surface-coating action, whereby a satisfactory and relatively inexpensive product is obtained.

In explanation of these effects, I may first point out that the hiding power of any pigment in oil increases with the difference in the refractive indices of the two substances. For example, finely ground quartz has a refractive index of 1.55, and when ground in linseed oil, the refractive index of which is 1.48, a practically transparent paint is produced. On the other hand, I have determined the refractive index of white lead to be 2.01, and this high factor accounts for the great hiding power of paints consisting of white lead and oil. I have found that the refractive index of zirconium oxid is approximately 2.20; and that when the finely-divided oxid is ground in oil, a white paint of great opacity is obtained. Now if zirconium oxid, or other suitable zirconium pigment, is formed by precipitation in the presence of a crystalline pigment such as silica, barium sulfate or the like, the particles of the latter become surface-coated with the zirconium pigment, possibly by adsorption, and a pigment possessing great hiding power is produced. Such a pigment containing a precipitated zirconium compound shows far greater hiding power than a pigment produced by mixing together the components in the same relative proportions. While I prefer in all cases to precipitate the zirconium pigment in presence of the base pigment, my invention is not limited to this particular method, inasmuch as mixed pigments well adapted for certain purposes may be prepared by other methods, including simply mixing the base pigment and the zirconium compound in the desired proportions, and with a sufficient degree of intimacy.

As representative methods by which such pigments may be produced, the following illustrative examples are given:—

Zirconium-containing minerals may be first washed with weak hydrochloric acid in order to remove iron and other soluble materials, and thereafter heated with alkaline carbonates or hydrates in order to break up combinations with silica, etc. The resulting mass is then thoroughly washed and suitably dried, and may be employed, when suitably subdivided, as a pigment. Preferably, however, the mass prepared as above is treated with a strong acid, for example concentrated sulfuric acid, or preferably is fused with sodium bisulfate, whereby a clear solution of zirconium sulfate may be obtained. To this solution there is added an alkali hydroxid, carbonate, or other suitable precipitant, whereby the zirconium is precipitated as hydroxid or basic carbonate or the like. There may be present in the precipitating vessel any desired quantity of base pigment, such as silica, or a suitable compound of calcium or barium. If lime is present, calcium sulfate is formed by interaction of the sulfate content of the zirconium solution, provided the sulfate of zirconium is used. If zirconium chlorid is used, the zirconium may be precipitated as an insoluble white coating upon the base pigment, by boiling the solution while introducing thereinto gaseous sulfur dioxid. In case the zirconium solution is in the form of sulfate containing some free sulfuric acid, an excellent composite pigment may be produced by the addition of an equivalent proportion of barium peroxid, whereupon barium sulfate will be precipitated and hydrogen peroxid will be liberated, and will in turn precipitate the zirconium as hydrated oxid. Other precipitation methods may of course be employed without departing from my invention.

Precipitates produced by the above or equivalent methods may be washed, dried, calcined, and ground if necessary, being thereby suitably prepared for preparation of paints. They may be mixed with zinc oxid, white lead or other pigments in any desired proportions. For example, I have secured excellent results with a pigment containing 25 parts by weight of zirconium oxid, 50 parts of barium or calcium sulfate, and 25 parts of zinc oxid.

Pigments prepared as herein described and either consisting of or containing substantial proportions of zirconium oxid or other insoluble compound of zirconium, are well adapted for use in paints in conjunction with linseed oil and other usual paint vehicles; and also for compounding with rubber as colorants and for the purpose of increasing its tensile strength. In this latter case the rubber constitutes an organic vehicle in the sense in which the term is used herein. The new pigments are also well adapted for use in admixture with oxidized oils or other organic vehicles in linoleum or other like compositions.

I claim:—

1. A new composition of matter, comprising an organic vehicle and a pigment, said pigment containing a substantial proportion of an insoluble compound of zirconium.

2. As a new composition of matter, a paint-pigment comprising zirconium oxid and a base pigment having a lower refractive index than zirconium oxid.

3. As a new composition of matter, a paint-pigment containing a substantial proportion of an insoluble precipitated compound of zirconium.

4. The method of preparing a pigment containing zirconium, which consists in precipitating an insoluble compound of zirconium in presence of a base pigment the hiding power of which is inferior to that of zirconium oxid.

5. The method of preparing a pigment containing zirconium, which consists in precipitating an insoluble compound of zirconium in presence of a base pigment the refractive index of which is less than that of zirconium oxid.

In testimony whereof I affix my signature.

HENRY A. GARDNER.